(12) United States Patent
Elvestad

(10) Patent No.: US 8,490,559 B2
(45) Date of Patent: Jul. 23, 2013

(54) METHOD AND APPARATUS FOR ATTACHING A SHIP RUDDER FOR RUDDER SHAFT, A RUDDER SHAFT, AND A SHIPRUDDER

(75) Inventor: Stig Elvestad, Saebo (NO)

(73) Assignee: Rolls-Royce Marine AS, Ulsteivik (NO)

( * ) Notice: Subject to any disclaimer, the term of this patent is extended or adjusted under 35 U.S.C. 154(b) by 217 days.

(21) Appl. No.: 12/811,858

(22) PCT Filed: Jan. 9, 2009

(86) PCT No.: PCT/NO2009/000009
§ 371 (c)(1),
(2), (4) Date: Aug. 5, 2010

(87) PCT Pub. No.: WO2009/102209
PCT Pub. Date: Aug. 20, 2009

(65) Prior Publication Data
US 2010/0288176 A1    Nov. 18, 2010

(30) Foreign Application Priority Data
Jan. 9, 2008    (NO) .................................... 20080155

(51) Int. Cl.
*B63H 25/06* (2006.01)
(52) U.S. Cl.
USPC ............................................................ 114/165
(58) Field of Classification Search
USPC ............................................. 114/162, 165–169
See application file for complete search history.

(56) References Cited

U.S. PATENT DOCUMENTS

| 2,452,334 | A | * | 10/1948 | Sprague | 114/169 |
| 3,919,962 | A | * | 11/1975 | Clay | 114/169 |
| 4,646,411 | A | | 3/1987 | Hankins | |
| 4,809,631 | A | * | 3/1989 | Kramer | 114/169 |
| 4,925,415 | A | | 5/1990 | Sutcliffe | |
| 6,321,588 | B1 | | 11/2001 | Bowers et al. | |
| 2002/0109656 | A1 | | 8/2002 | Yoshikawa | |

FOREIGN PATENT DOCUMENTS

| EP | 1316799 A2 | 6/2003 |
| GB | 1586703 | 3/1981 |
| GB | 2364807 A | 2/2002 |

(Continued)

OTHER PUBLICATIONS

PCT/NO2009/000009 International Search Report, Apr. 9, 2009.

*Primary Examiner* — Daniel Venne
(74) *Attorney, Agent, or Firm* — Conley Rose, P.C.

(57) ABSTRACT

The present invention concerns an apparatus and method for attaching a ship rudder to a rudder shaft. The rudder shaft includes a cylindrical portion and an expanded flange part with a cylindrical portion, followed by a conical portion. The rudder includes a rudder element and a flange element for attachment to the rudder element. The flange element includes an internally cylindrical portion for mating, sliding and sealingly surrounding the cylindrical portion of the rudder shaft and an internally cylindrical portion for sliding, mating arrangement around the cylindrical portion of the flange part of the rudder shaft. The rudder element also includes a conical opening for mating attachment to the conical portion of the conical portion of the rudder shaft. It is provided channels for applying hydraulic pressure between the expanded flange part of the flange element, and means for tightening the flange element to the rudder element. Furthermore the invention comprises a rudder shaft for a ship rudder, a ship rudder with a conical opening, and a method for disassembly of a ship rudder from a rudder shaft.

12 Claims, 2 Drawing Sheets

FOREIGN PATENT DOCUMENTS

Figure 1:
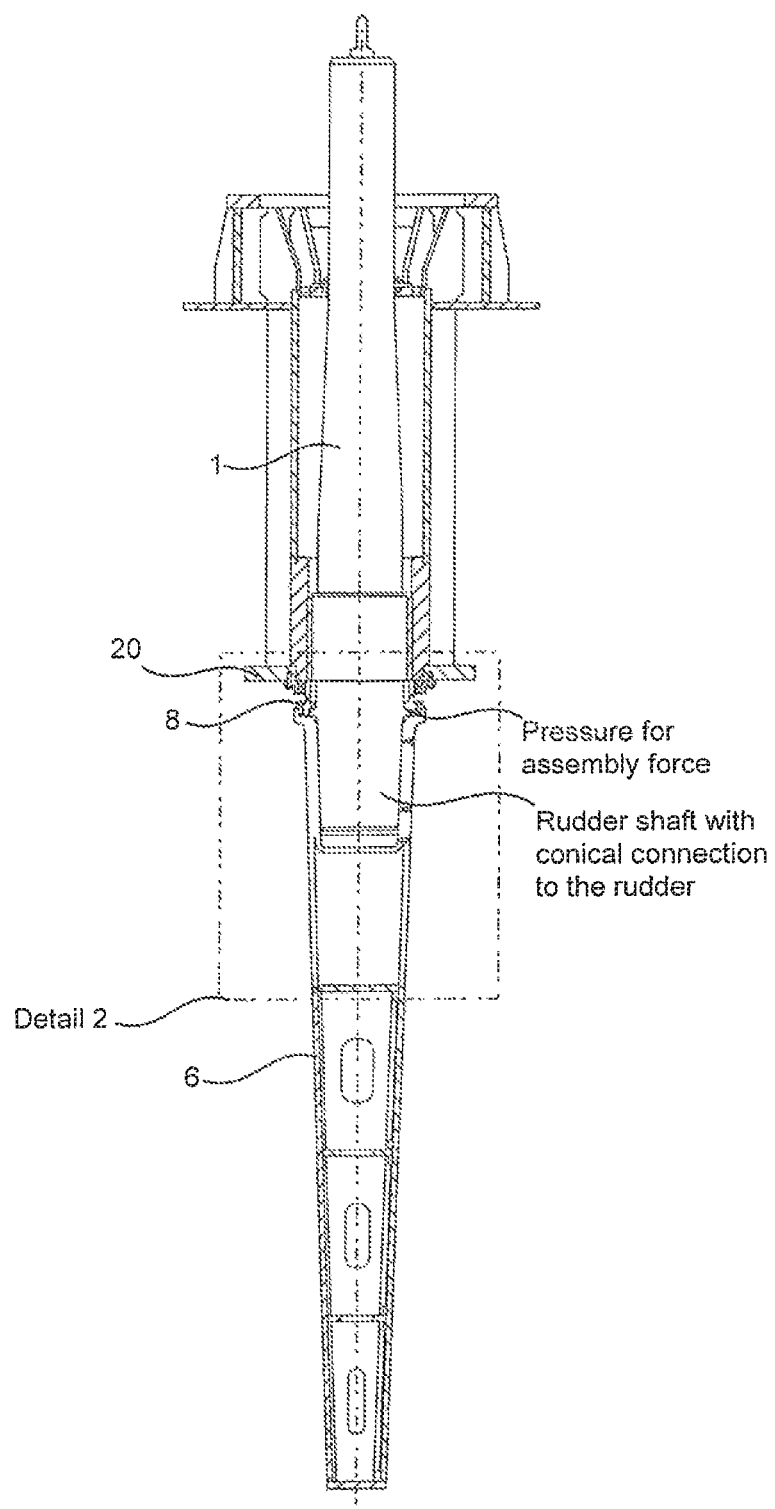

| | | |
|---|---|---|
| JP | 7033088 A | 2/1995 |
| JP | 8034397 A | 2/1996 |
| JP | 2002109656 A | 4/2002 |
| SU | 740611 A1 | 6/1980 |
| WO | 0016091 | 3/2000 |

* cited by examiner

METHOD AND APPARATUS FOR ATTACHING A SHIP RUDDER FOR RUDDER SHAFT, A RUDDER SHAFT, AND A SHIPRUDDER

CROSS-REFERENCE TO RELATED APPLICATIONS

This application is a 35 U.S. C. §371 national stage application of PCT Application No. PCT/NO2009/000009, filed 9 Jan. 2009, and entitled An Arrangement for Attaching a Ship Rudder to a Rudder Shaft, a Rudder Shaft, a Ship Rudder and a Method for Disassembly of a Ship Ship Rudder from a Rudder Shaft, hereby incorporated herein by reference, which claims priority to Norwegian Patent Application No. 20080155, filed 9 Jan. 2008, hereby incorporated herein by reference.

STATEMENT REGARDING FEDERALLY-SPONSORED RESEARCH OR DEVELOPMENT

Not applicable.

BACKGROUND

The present invention concerns an apparatus for attaching a ship rudder with a conical opening to a rudder shaft, a rudder shaft, a ship rudder with a conical opening in the rudder and a method for attaching a rudder shaft to a ship rudder.

During attachment of a ship rudder with a conical connection between the rudder and the rudder shaft, it has turned out that the current solutions result in limitations in optimisation of rudder design with respect to hydrodynamics, propulsion efficiency, installation processes and production costs.

Today, normally are rudders attached to the rudder shaft by means of a conical connection, where a hydraulic pressure is applied between the rudder and the rudder shaft in the conical surface and hydraulic pressure is applied to an assembly tool, normally designed as a nut with an internal hydraulic piston (hydraulic nut). The hydraulic nut is assembled to the lower part of the rudder shaft and pulls the rudder shaft down into the rudder. It is necessary with access to the nut through one or several openings in the rudder. When the assembly process has been performed, the assembly tool or nut is locked towards the rudder shaft and then acts as a safeguard against the rudder falling off if the conical connection should fail. The opening or openings in the rudder are thereafter closed with one or several covers. This solution is however unfavourable, in particular with large rudder shaft diameters, because the hydraulic nut becomes large and bulky, and is vulnerable to damages. Furthermore the opening or openings in the rudder for access to the hydraulic nut leads to unfavourable stress concentrations, and reduces the material cross section in this section of the rudder. This reduces the physical strength of the rudder, and this has to be compensated with a more bulky and heavy structure in the rudder. This again leads to increased production costs. Furthermore the rudder must physically include space for the hydraulic nut, and the thickness of the rudder may be dictated by this space. This poses further limitations for optimisation of the rudder design with respect to hydrodynamics and propulsion efficiency.

In JP 8-34397 it is shown a structure for assembly of a rudder and a rudder shaft with a conical portion and a system for hydraulic tightening.

SUMMARY OF THE EMBODIMENTS

With the assembly concept according to the present invention, it is used a conical connection corresponding to the one that already exists, as described above. However the rudder shaft is designed toward the top of the rudder such that it is formed a chamber, that when a hydraulic pressure is applied substitute the assembly force that in the solution described above is provided by the hydraulic nut. When the assembly process has been performed, the chamber is tightened with suitable units and this will then act as a safeguard to prevent the rudder from falling off if the conical connection should fail. With this solution it is achieved a lower number of and smaller components, and the requirement for an opening in the side of the rudder is eliminated. In this manner the structure of the rudder can be made more slender and lighter, and the production costs can be reduced. Of the same reason may the rudder design to a greater extent be optimised with respect to hydrodynamics and propulsion efficiency. With a solution as defined in the present invention, it is in other words possible to achieve a connection between the rudder and the rudder shaft with an assembly force from a hydraulic pressure in a chamber that is integrated in the rudder and the rudder shaft, and the assembly force can be applied in the conical connection between the rudder and the rudder shaft at the largest diameter of the cone. The conical connection between the rudder and the rudder shaft has accordingly an assembly process without any requirements of access to the smallest diameter of the cone. No assembly tools or openings in the skin-plates of the rudder for access to the cone are required. Furthermore it is not required any threaded portion of the rudder shaft, a hydraulic nut, or a nut below the cone as a safeguard to prevent the rudder from falling off if the conical connection should fail.

Accordingly the present invention concerns an apparatus for attachment of a ship rudder with a conical opening to a rudder shaft with a corresponding conical part. The rudder shaft includes, in a direction towards the rudder, a cylindrical portion followed by an expanded flange part with a cylindrical portion, followed by the conical portion of the rudder shaft. The rudder includes a rudder part and a flange element or part for attachment in the rudder element. The flange element includes an inner cylindrical portion for mating, sliding and to sealingly surrounding the cylindrical portion of the rudder shaft. Furthermore it is provided channels for applying hydraulic pressure above the expanded flange part in the flange element. The flange element can be tightened to the rudder element by means of means for tightening, typically bolts or a threaded ring/collar on the flange and the rudder part. The flange element also includes an inner cylindrical portion for sliding, mating arrangement around the cylindrical portion of the flange part of the rudder shaft.

The cylindrical portions ensure that it is formed a sealed chamber between the parts of the rudder shaft and the flange that can be exposed to hydraulic pressure to press the rudder shaft downwards in relation to the flange and the rudder part. Channels are provided for applying the hydraulic pressure between the rudder shaft and the flange part in an area between the cylindrical portion of the rudder shaft and the cylindrical portion of the expanded flange part. It is formed a chamber between the flange and the rudder shaft that is expanded when the hydraulic pressure presses these parts apart.

In the case bolts are used, these may extend between the rudder part and the flange part. The bolts are typically placed in a ring around the flange part.

In the case threaded rings are used to tighten the flange part to the rudder part, may this include external threads on the flange part and internal threads on the rudder part. In this case may the flange part include milled out sections for contact with a suitable tool for tightening purposes.

Furthermore may the apparatus include channels for applying hydraulic pressure between the conical opening in the rudder part and the conical portion of the rudder shaft for expanding the conical opening in the rudder part during assembly. The channels may typically be sealed with suitable sealing bolts or plugs when these not are in use.

Sealing rings may be provided for sealing between the cylindrical portion of the rudder shaft and the inner cylindrical portion of the flange part and between the cylindrical portion of the expanded flange part of the rudder shaft and the inner cylindrical portion in the flange part to prevent leakage of hydraulic fluid during assembly and to prevent ingress of seawater between these elements. These sealing rings will during assembly act as piston rings between the cylindrical faces. The sealing rings will typically be made of an elastomeric material.

The conical opening in the rudder may extend into a bottom portion, and the rudder shaft includes an end portion. The bottom portion and the end portion may form a sealed chamber with a sealable supply channel for bleeding during assembly and for application of hydraulic pressure for disassembly. The bleeding ensures that no pressure undesirably is build up in the chamber during assembly.

It may be placed sealing rings between the conical portion of the rudder shaft and the conical opening at the upper part of the cone, near the flange, and at the lower part of the cone, near the end portion of the rudder shaft. The purpose of the sealing rings is to prevent ingress of seawater, and to reduce leakage of hydraulic fluid, such that a sufficient pressure is achieved during assembly.

The end portion of the rudder shaft may be substantially plane, as no attachment of a nut at the lower end of the rudder shaft is required.

Furthermore the invention concerns a rudder shaft for a ship rudder with a portion for attachment to a rudder adapted for being fixed to the rudder with an apparatus as described above. The portion includes, in a direction toward the rudder, a cylindrical portion followed by an expanded part with a cylindrical portion, followed by a conical portion.

The conical portion may further transfer into a plane end portion.

The rudder shaft may further include a step after the cylindrical part of the expanded portion.

Furthermore the invention concerns a ship rudder with a conical opening in the rudder adapted for attachment of a rudder shaft with an apparatus as described above. The rudder includes a rudder part, a flange part, and means for tightening the flange part to the rudder part. The flange part includes at least one inner cylindrical portion, with a first diameter, for sealing, sliding contact with a rudder shaft, and at least one further cylindrical portion with a second diameter that is greater than the diameter of the first diameter, on the flange part.

The conical opening of the rudder part may end in a closed bottom portion of the lower end of the conical portion.

The rudder may further include a channel for applying a hydraulic pressure to the closed bottom portion.

A method for attaching a rudder shaft to a ship rudder may include leading a conical portion of the rudder shaft into a conical opening in the rudder. A flange part is led over the rudder shaft all the way to an expanded flange part with a cylindrical portion on the rudder shaft. The flange part may then be tightened towards the rudder part with means for tightening of these components towards each other. A hydraulic pressure is applied between the flange part and the expanded flange part of the rudder shaft such that the conical portion of the rudder shaft is pressed down into the conical opening of the rudder part. The hydraulic pressure may then be unloaded and the flange part can furthermore be tightened towards the rudder part with the means for tightening.

The method may further include applying hydraulic pressure between the conical portion of the rudder shaft and the conical opening in the rudder part through channels for expanding the conical opening when the rudder shaft is pressed down into the rudder part.

The ship rudder may be disassembled from the rudder shaft by loosening the means for tightening between the flange part and the rudder part and apply pressure to the chamber between the end portion of the rudder shaft and the bottom portion of the conical opening through the sealable supply channel such that the rudder shaft is pressed out of the rudder part.

An example of prior art is disclosed in the Patent Application EP 1 316 799 A2, where a gas detector for a specific gas is used to control a ventilation system. This publication relates mostly to algorithm for calculation of threshold values for activation.

The International Patent Application WO 00/16091 A1 describes a gas sensor group for a number of specific gases where control devices for the single gas sensors are powered down and up by a multiplexer to avoid crosstalk of signals from single sensors.

The Patent Applications US-2004065140 A1, GB-2364807 A, JP-2002109656 A and U.S. Pat. No. 6,321,588 B1 show systems and methods used to monitor changes in gas concentrations or gas leaks at hardly accessible places in industrial plants. These comprise at least one sensor and energy saving methods by sensors and other components being able to be powered down or the use of pulsed batteries.

These examples of prior art in the field do not solve the problem which is described above. The present invention seeks to satisfy the above mentioned need for reasonably priced and energy efficient gas detectors.

SHORT DESCRIPTION OF THE ENCLOSED FIGURES

Figure 2:
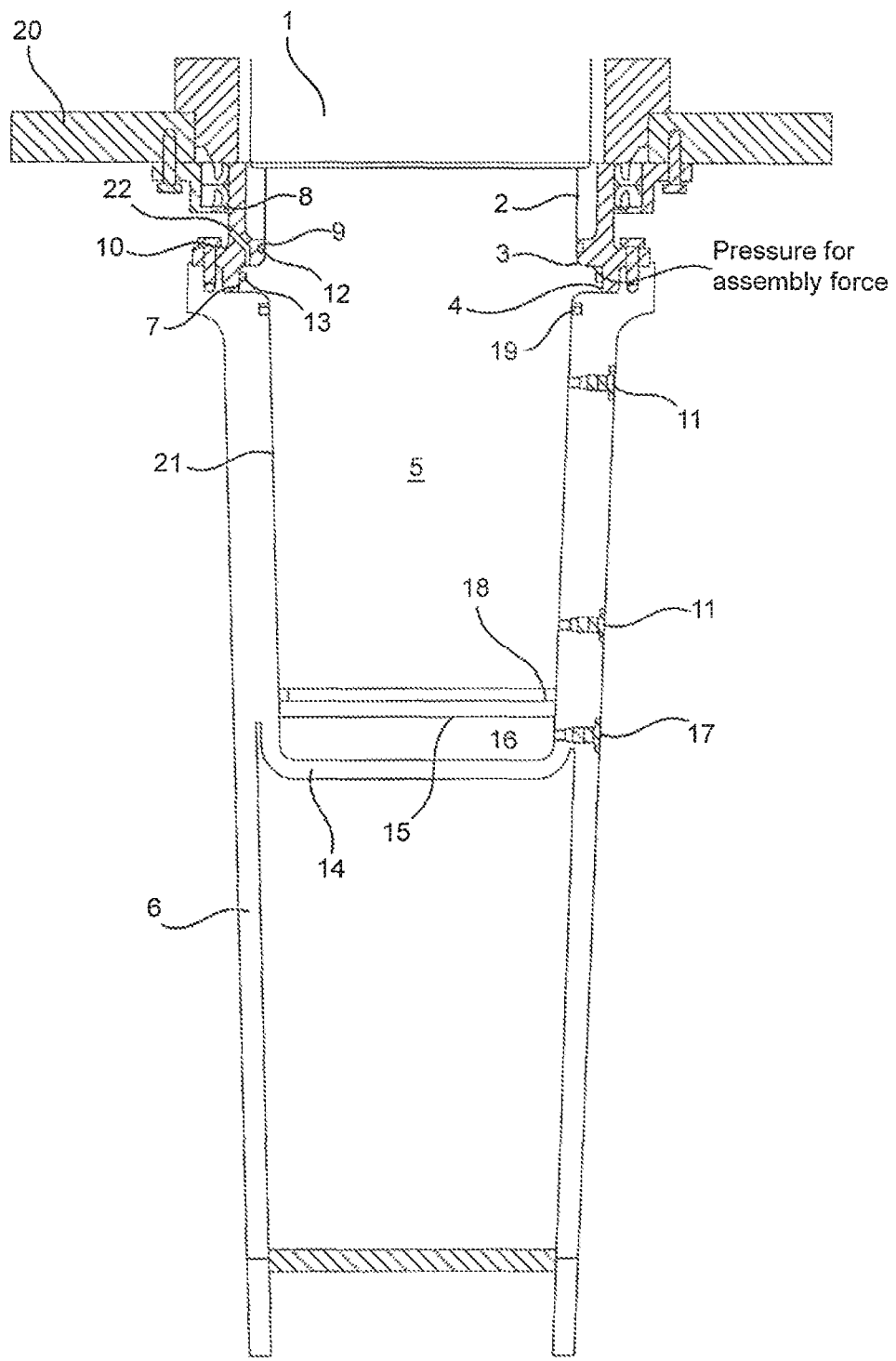

FIG. 1 shows a cross section of a rudder and a rudder shaft according to the invention; and FIG. 2 shows a detail of FIG. 1.

DETAILED DESCRIPTION OF THE EMBODIMENTS WITH REFERENCE TO THE ENCLOSED FIGURES

In FIG. 1 it is shown a section through a rudder attached to a rudder shaft 1 according to the invention. The rudder includes a rudder part 6 and a flange part 8. The rudder part 6 is shown attached to the rudder shaft 1, that furthermore is supported in a vessel 20.

The flange part 8 is shown attached to the rudder part 6 and is placed around the rudder shaft 1.

As shown in FIG. 1, there are no openings in the rudder 6, and this is advantageous as previously described.

In FIG. 2 is the rudder element 6, the rudder shaft 1, the flange part 8 and the vessel 20 shown in greater detail.

In FIG. 2 it is shown how the rudder shaft 1 includes a cylindrical portion 2 followed by an expanded flange part 3. The expanded flange part 3 also includes a cylindrical portion 4 with a greater diameter than the cylindrical portion 2. The cylindrical portion 2 and the cylindrical portion 4 of the expanded flange part 3 is in sealing and sliding contact with the flange element 8 placed around the rudder shaft 1. Seals or sealing rings 12, 13 are placed for sealing between the flange element 8 and the rudder shaft 1 on the cylindrical areas.

The rudder shaft 1 or the flange element 8 includes one or several channels 22 for applying a hydraulic pressure between the sealing ring 12 and the sealing ring 13. When pressure is applied to the channel(s) 22, it will thereby be created a pressure that will force the rudder shaft 1 downwards in relation to the flange part 8.

The rudder shaft 1 also includes a conical portion 5 that goes into a corresponding conical recess or opening 21 in the rudder part or element 6.

The flange part or element 8 is bolted to the rudder element 6 with bolts 10 placed in a perimeter around the flange element 8.

The conical portion 5 of the rudder shaft 1 includes a sealing ring 19 at the upper portion of the conical portion 5, below the expanded flange part 3, and a sealing ring 18 at the end portion 15 of the rudder shaft 1. These sealing rings 18, 19 seals between the conical portion 5 of the rudder shaft 1 and the conical opening 21 in the rudder element 6. Hydraulic pressure can be applied to the channels 11, and this pressure can expand the conical opening 21 during assembly, to be able to press the conical portion 5 of the rudder shaft 1 further down into the conical opening 21 of the rudder element 6. The sealing rings 18 and 19 reduce the leakages during this application of pressure.

The rudder shaft 1 has a lower end portion 15, and the conical opening 21 has a sealed bottom portion 14, and together these portions form a sealed chamber 16 with the sealable supply channel 17. The supply channel 17 ensures that no pressure is build up in the chamber 16 during assembly. Furthermore may pressure be applied to the supply channel 17 and the cavity or chamber 16 during a possible disassembly of the rudder from the rudder shaft to press the rudder shaft 1 out of the rudder element 6.

The invention claimed is:

1. A system for attaching a ship rudder to a rudder shaft, the system comprising:
   a rudder shaft including a cylindrical portion, an expanded flange part axially adjacent the cylindrical portion, and a conical portion axially adjacent the expanded flange part, wherein the expanded flange part has a cylindrical portion;
   a rudder including a rudder element and a flange element coupled to the rudder element, the flange element including an internal cylindrical portion slidingly engaging the cylindrical portion of the rudder shaft and an inner cylindrical portion slidingly engaging the cylindrical portion of the flange part of the rudder shaft;
   wherein the conical portion of the rudder shaft is seated in a mating conical recess of the rudder element;
   one or more channels for applying a hydraulic pressure between the rudder shaft and the flange element in an area between the cylindrical portion of the rudder shaft and the cylindrical portion of the expanded flange part.

2. The system according to claim 1, where the flange element is coupled to the rudder element with a plurality of bolts extending between the rudder element and the flange element.

3. The system according to claim 1, where the flange element is coupled to the rudder element with external threads on the flange element and internal threads on the rudder element.

4. The system according to claim 1, further including one or more channels for applying hydraulic pressure between the conical recess in the rudder element and the conical portion of the rudder shaft for expanding the conical recess in the rudder element during assembly.

5. The system according to claim 1, further including a first sealing ring for sealing between the cylindrical portion of the rudder shaft and the inner cylindrical portion of the flange element and a second sealing ring for sealing between the cylindrical portion of the expanded flange part of the rudder shaft and the internal cylindrical portion of the flange element.

6. The system according to claim 1, wherein the conical recess in the rudder element has a bottom portion;
   wherein the rudder shaft includes an end portion; and
   wherein the bottom portion and the end portion form a sealed chamber in fluid communication with a sealable supply channel for bleeding during assembly and for application of hydraulic pressure during disassembly.

7. The system according to claim 1, where a first sealing ring is positioned between the conical portion of the rudder shaft and the conical recess proximal the flange, and a second sealing ring is positioned between the conical portion of the rudder shaft and the conical recess proximal an end portion of the rudder shaft.

8. The system according to claim 7, where the end portion of the rudder shaft is substantially flat.

9. A rudder shaft for attachment to a ship rudder, the rudder shaft comprising:
   a portion for attachment to the rudder including a cylindrical portion, an expanded flange part axially adjacent the cylindrical portion, and a conical portion axially adjacent the expanded flange;
   wherein the expanded flange part has a cylindrical portion.

10. The rudder shaft according to claim 9, wherein the conical portion terminates in a substantially flat end portion.

11. The rudder shaft according to claim 9, further including a step after the cylindrical portion of the expanded flange part.

12. A method for disassembly of a ship rudder from a rudder shaft, the rudder shaft including a cylindrical portion, an expanded flange part axially adjacent the cylindrical portion, and a conical portion axially adjacent the expanded flange part, and the rudder including a rudder element and a flange element coupled to the rudder element, wherein the flange element includes an internal cylindrical portion slidingly engaging the cylindrical portion of the rudder shaft and an inner cylindrical portion slidingly engaging a cylindrical portion of the flange part of the rudder shaft, wherein the conical portion of the rudder shaft is seated in a mating conical recess of the rudder element, the method comprising:
   decoupling the flange element and the rudder element; and
   applying pressure to a sealed chamber between an end portion of the rudder shaft and a bottom portion of the conical recess through a sealable supply channel to press the rudder shaft out of the rudder element.

* * * * *

UNITED STATES PATENT AND TRADEMARK OFFICE
CERTIFICATE OF CORRECTION

PATENT NO. : 8,490,559 B2  
APPLICATION NO. : 12/811858  
DATED : July 23, 2013  
INVENTOR(S) : Stig Elvestad Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 165 days.

Signed and Sealed this
Eighth Day of September, 2015

Michelle K. Lee
*Director of the United States Patent and Trademark Office*